Feb. 14, 1967   W. D. PRICER   3,304,505
FUNDAMENTAL FREQUENCY DETECTION SYSTEM
Filed Dec. 9, 1963   2 Sheets-Sheet 1
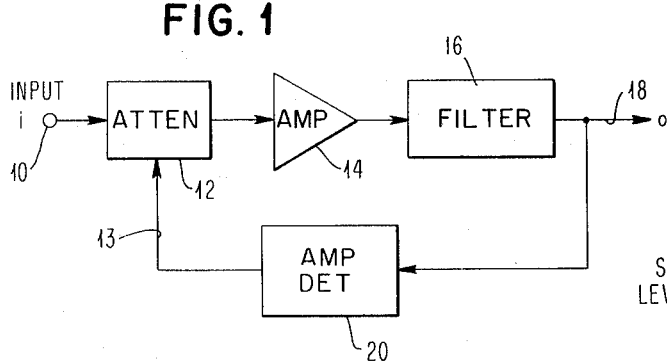
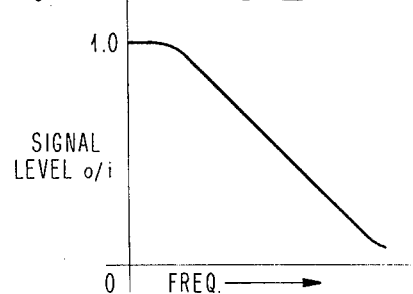
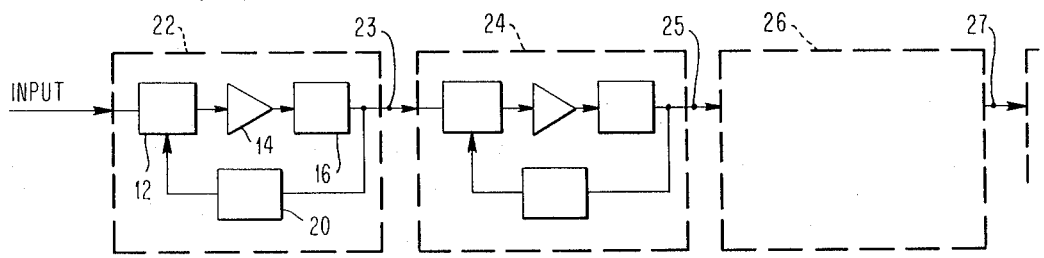
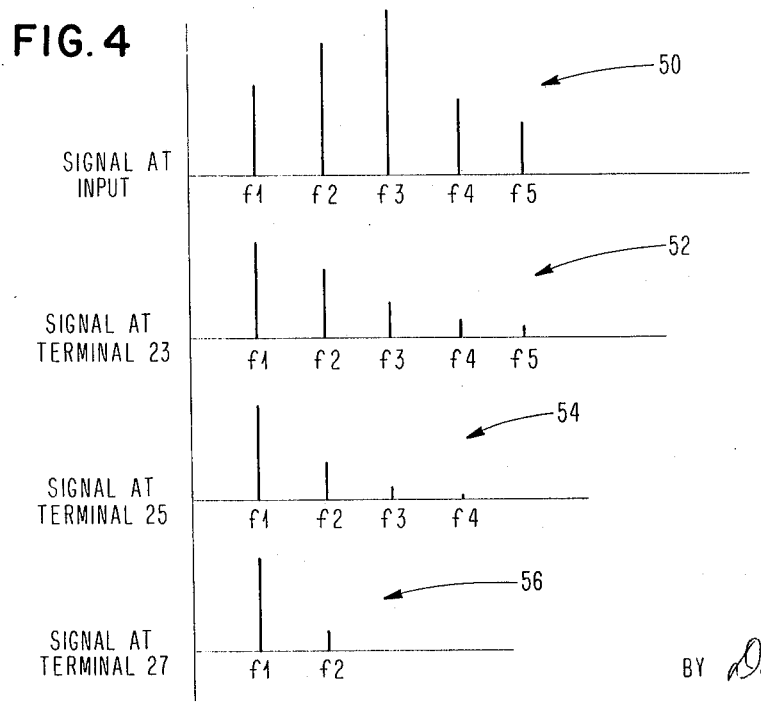
INVENTOR
WILBUR D. PRICER
BY David N Koffsky
ATTORNEY Feb. 14, 1967   W. D. PRICER   3,304,505
FUNDAMENTAL FREQUENCY DETECTION SYSTEM
Filed Dec. 9, 1963
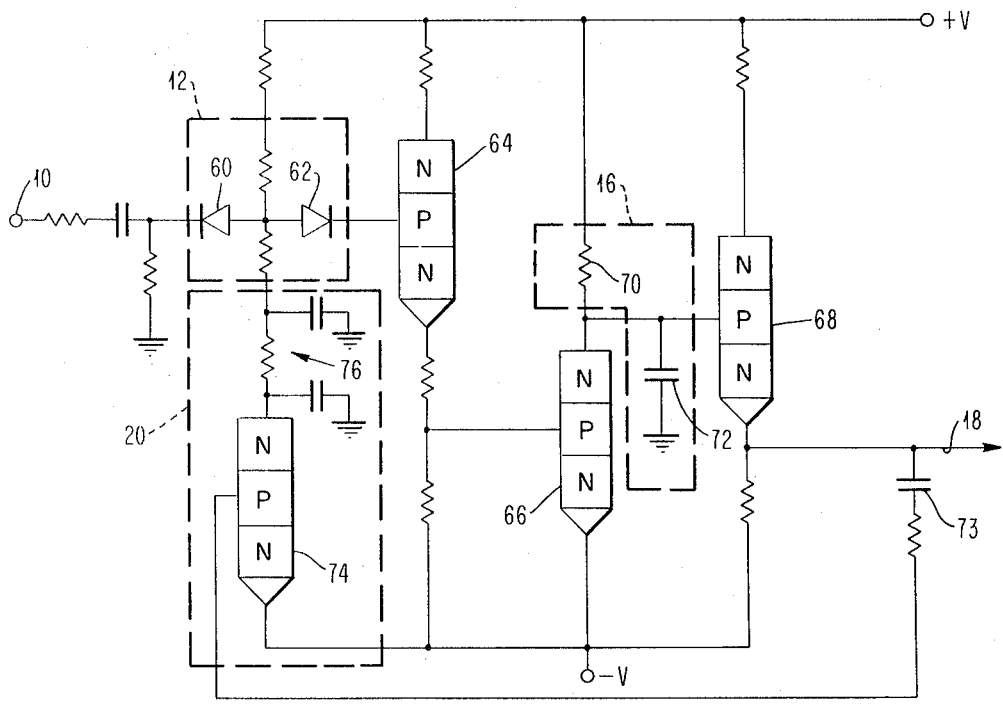
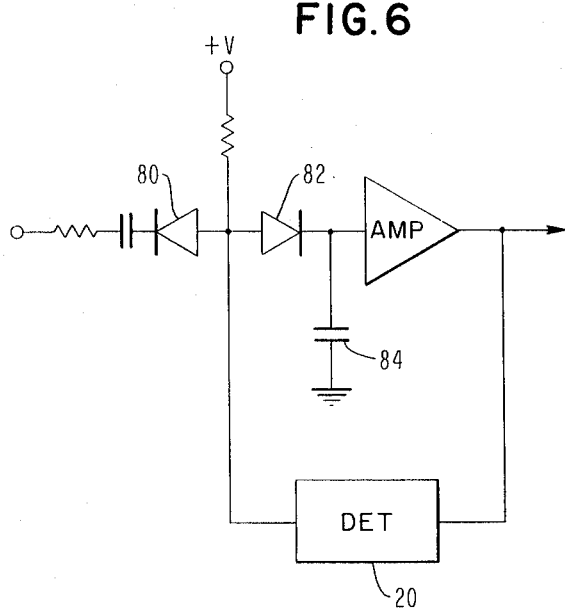
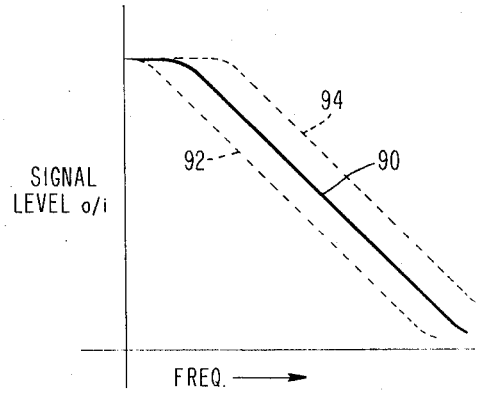

United States Patent Office 3,304,505
Patented Feb. 14, 1967

3,304,505
FUNDAMENTAL FREQUENCY DETECTION SYSTEM
Wilbur D. Pricer, Pleasant Valley, N.Y., assignor to International Business Machines Corporation, New York, N.Y., a corporation of New York
Filed Dec. 9, 1963, Ser. No. 328,971
9 Claims. (Cl. 328—139)

This invention relates to a signal analysis system and more particularly to a system for determining the fundamental recurrence frequency of a periodic signal waveform.

In situaitons where it is necessary to synchronize an electronic circuit with a series of received data signals, it has been required to either know the basic, or fundamental frequency of the signal waveform or to provide complex signal analysis equipment for its determination. In the oscilloscope art, the problem of unknown or roughly known fundamental frequencies has been solved, for instance, by providing adjustable time base frequency generators to synchronize the sweep with incoming signals. This solution, however, is unsatisfactory when and if the fundamental frequency of the incoming signals is subject to variations since the displayed image is then subject to jitter or unwanted movement. Similar problems exist in data communications equipment.

The prior art has, in a number of ways, attempted to cope with the problem of automatically extracting the fundamental frequency from a complex waveform for synchronization purposes. As is well known, the fundamental frequency of a periodic waveform is, by definition, the lowest recurring frequency. One of the simpler methods by which the prior art has attempted to extract this frequency, was to cascade a series of low pass filters with interspersed amplifiers to provide necessary interstage gain. This method was satisfactory if the frequency of the fundamental was known, since the gain of the coupling amplifiers could properly be adjusted to offset the filter attenuation and thus prevent the fundamental frequency component from either saturating the amplifiers or falling off into the system noise. When, however, the fundamental was unknown, this method was obviously inadequate and would not perform the desired function.

Accordingly, it is an object of this invention is to provide a system which is capable of determining the unknown fundamental recurrence frequency of any periodic waveform.

A still further object of this invention is to provide a system for determining the fundamental frequency of a recurring waveform which is of simple design.

Another object of this invention is to provide a system for determining the fundamental frequency of a periodic waveform wherein the sensitivity of the system automatically adjusts itself to be greatest at the fundamental frequency.

In accordance with the above objects, there is provided a variable attenuator, amplifier and low pass filter connected in series through which the periodic waveform is passed. The filter is so constructed as to provide waveform is passed. The filter is so constructed as to provide increasing attenuations for increasingly higher frequencies. A feedback amplitude detector averages the output potential and causes the system gain to remain at a preset level. This thereby insures that after the recurring waveform is processed in the main signal stream to emphasize its fundamental frequency, that the resulting signal remains at a usable level. By connecting like systems in cascade, and serially causing the waveform to pass therethrough, the fundamental frequency is the only portion of the waveform which remains after very few successive iterations.

The foregoing and other objects, features and advantages of the invention will be apparent from the following more particular description of the preferred embodiments of the invention, as illustrated in the accompanying drawings.

In the drawings:

FIG. 1 s a block diagram of a circuit which embodies the invention.

FIG. 2 is a plot of frequency versus signal level for the filter shown in FIG. 1.

FIG. 3 is a circuit block diagram showing cascaded iterations of the invention of FIG. 1.

FIG. 4 is a plot of signal frequency components versus signal level at succeeding terminals in the circuit of FIG. 3.

FIG. 5 is a schematic diagram showing the details of the embodiment of the invention of FIG. 1.

FIG. 6 is an alternative circuit embodiment of the invention.

FIG. 7 is a plot of frequency versus signal level for the embodiment of FIG. 6.

Referring now to FIG. 1, a periodic signal whose fundamental frejuency is to be determined is applied to input terminal 10. Connected to terminal 10 is an electronically variable attenuator 12 which is adapted to adjust the level of an input signal in accordance with the voltage level appearing on conductor 13. The output of attenuator 12 is applied through a wide band ampliefir 14 to filter 16. Filter 16 is of the low pass variety, having a frequency versus signal level characteristic such as that shown in FIG. 2. In its most simple form, filter 16 may comprise a capacitor and resistance combination which exhibits an attenuation of 6 db per octave. The one constraint which must be placed upon filter 16 is that the fundamental frequency of the input signal waveform must fall somewhere within the negative sloping portion of the frequency versus signal level characteristic. Connected to output conductor 18 from filter 16 is a feedback net work which includes amplitude detector 20. The signal appearing on conductor 18 is rectified and smoothed in amplitude detector 20 and applied as a control voltage via conductor 13 to attenuator 12. This feedback network is designed to maintain the input-output gain of the system at a preset or predetermined level by causing the attenuator to either decrease the attenuation if the signal level falls below a desired limit or, to increase the attenuation if the signal level rises above a desired limit.

In operation, a periodic signal is applied to terminal 10, attenuated in attenuator 12, amplified in amplifier 14, and then supplied to filter 16. In filter 16 the various frequency components of the periodic signal are subjected to increasing attenuations in accordance with their increasingly higher frequencies. Since the fundamental frequency is invariably the lowest frequency appearing in the periodic signal, it is obvious that the fundamental will always be attenuated less than all other frequencies. The output signal appearing on conductor 18 therefore contains a relatively emphasized fundamental frequency. This signal is then fed back through detector 20 to control the attenutation in attenuator 12 so that the output remains at the desired preset level.

If the fundamental frequency of the periodic waveform were in all cases known, the gain of amplifier 14 could be preset so as to cause its amplification to exactly overcome the attenuation which the signal is subjected to in filter 16. However, due to the fact that the fundamental is known only within wide limits (the negatively sloping portion of the filter characteristic) it is impossible to adjust amplifier 14 so as to insure that its amplification exactly offsets the attenuation experienced in filter 16. In order to overcome this problem it was determined that the inclusion of the above described gain control would turn an inoperable system into a completely operable one.

Due to the fact that a single stage of fundamental frequency emphasis, as provided by the circuit of FIG. 1, is generally inadequate to emphasize the fundamental to the desired level, successive iterations of the circuit are utilized as shown in FIG. 3. The circuits contained in the dotted boxes 22, 24 and 26 are identical to those shown in FIG. 1 and are connected in cascade to provide the desired characteristic. The operation of the circuit of FIG. 3 will be described in conjunction with the frequency diagram of FIG. 4.

Assume that a periodic input waveform is composed of frequency components $f1$ (the fundamental) and its harmonics $f2$, $f3$, $f4$ and $f5$ with relative amplitudes as indicated in FIG. 4. It should here be realized that the assumed case is worse than one which would normally be expected since the indicated amplitude of the fundamental frequency $f1$ is smaller than its second and third harmonic components $f2$ and $f3$ respectively. Normally, the fundamental frequency is the highest amplitude component of the input waveform.

If a periodic signal, exhibiting component frequency characteristics as generally indicated by graph 50 in FIG. 4, is applied to the input terminal of the system in FIG. 3, all of the frequency components will be attenuated in attenuator 12, amplified in amplifier 14 and then applied to filter 16. It may be assumed, for this example, that filter 16 provides a 6 db per octave attenuation of all frequency components. As is well known, an attenuation of 6 db per octave results in an approximate one half power attenuation per octave. Thus, assuming that the fundamental frequency receives *no* attenuation (the validity of this assumption will hereinafter become apparent), the second harmonic $f2$ will be reduced in amplitude by approximately one half (being a full octave from the fundamental), the third harmonic $f3$ to approximately one third of its size (being an octave and a half from the fundamental), the fourth harmonic to approximately one fourth of its size (being two full octaves away from the fundamental), and the fifth harmonic to approximately one fifth of its size. Thus, at the output of filter 16, the relative amplitudes of the frequency components are as generally indicated by graph 52 in FIG. 4.

As aforestated, it can be assumed that the fundamental frequency is not attenuated due to the feedback path through amplitude detector 20. This path establishes the gain of the system to any desired level. In this case it will be assumed that there is unity gain or a 1-to-1 transition between input and output. For this reason, the lines representing the amplitude of the fundamental frequency component $f1$ in FIG. 4 stay at a constant height.

As the signal waveform proceeds to the second iteration (box 24), it can be seen in graph 54 that the second harmonic will again be reduced to one half of its amplitude, the third harmonic to one third of its amplitude, etc. At this point the fourth harmonic is no longer visible. After the third iteration (box 26) the signal waveform is as indicated by graph 56 in FIG. 4. At this point only the fundamental and a very small amplitude second harmonic remain in the signal waveform. If desired, another iteration can be added to the signal processing system; however, enough of the fundamental now exists to easily derive a synchronizing signal therefrom.

Referring now to FIG. 5, there is shown a schematic embodiment of the block diagram of FIG. 1. Attenuator 12 is composed of two anode-to-anode connected diodes 60 and 62 with the output of amplitude detector 20 being applied therebetween. By either raising or lowering the potential at the common anode connection between diodes 60 and 62, the resistance between input terminal 10 and the base circuit of transistor 64 can be made to change quite radically. Transistors 64, 66 and 68 provide the required amplification as generally indicated by amplifier 14 in FIG. 1. Resistor 70 and capacitor 72 provide the required filtering action indicated by the filter 16 in FIG. 1. A feedback connection is taken from output terminal 18 through a D.C. isolating capacitor 73 back to the base of transistor 74 which is biased to act as a rectifier. The rectified potential at the collector of transistor 74 is applied across RC smoothing network 76 and then applied to the common point between the anodes of diodes 60 and 62 as the control potential.

Referring now to FIG. 6, there is shown an alternative embodiment of the invention wherein a modified gain adjustment feature is incorporated. In this circuit, diodes 80 and 82 now not only provide the required attenuation, but also act as a variable resistance for capacitor 84, the combination acting as a low pass filter. The remainder of the circuit is similar to that shown in FIG. 1 except that the placement of the amplifier and filter have been reversed. In this case, the operation of the circuit is such that the gain adjustment comes not only from the attenuation of diodes 80 and 82, but also from the attenuation due to the combination of diodes 80 and 82 and capacitor 84. In particular, if the output level is high, detector 20 produces a high D.C. output which causes the resistance of the diode attenuator to increase. As the cathode-to-cathode resistance between diodes 80 and 82 increases, the characteristic curve 90 (FIG. 7) will be caused to move to the left (e.g., 92). This is due to the fact that the RC time constant of the filter has increased, which thereby decreases its cutoff frequency. Due to this shift in the frequency-signal level characteristic, all of the frequency components are subjected to a greater attenuation with the result that the desired output attenuation occurs. On the other hand, if the output signal level is too low, the cathode-to-cathode resistance between diodes 80 and 82 decreases and the time constant of the RC filter decreases with a resultant increase in cutoff frequency. This phenomenon is shown by the curve 94 in FIG. 7 and indicates that all frequency components receive correspondingly less attenuation thereby providing a greater output voltage.

While the invention has been particularly shown and described with reference to preferred embodiments thereof, it will be understood by those skilled in the art that various changes in form and details may be made therein without departing from the spirit and scope of the invention.

What is claimed is:

1. In a system for deriving the unknown fundamental frequency of a signal waveform, the combination comprising
   input and output connections, said signal waveform being applied at said input connection;
   signal amplification means having a variable gain;
   low pass band filter means for attenuating the second harmonic of said fundamental frequency and all higher harmonics thereof so as to reduce the amplitudes of the harmonic frequencies relative to the amplitude of the fundamental frequency;
   means for serially connecting said signal amplification means and filter means between said input and output connections; and
   feedback means coupled between said output and said amplification means for providing a control signal to said amplification means indicative of the signal level at said output connection, to cause said means to vary the gain imparted to said signal waveform so as to insure a preset system gain.

2. The invention as in claim 1 wherein said feedback means comprises an amplitude detector.

3. The invention as in claim 2 wherein said signal amplification means comprises a pair of anode-to-anode connected diodes and an amplifier, with the control signal from said amplitude detector being connected to the common anode connection.

4. The invention as described in claim 3 wherein said filter means provides an attenuation characteristic of at least 6 db per octave.

5. A system for deriving the unknown fundamental of a signal waveform wherein said system includes a plurality of cascade connected stages, each stage comprising the elements as defined in claim 1.

6. In a system for deriving the unknown fundamental frequency of a periodic signal, the combination comprising a variable signal attenuator to which said periodic signal is applied, for attenuating said periodic signal an amount determined by a control signal, an amplifier connected to said attenuator for amplifying said attenuated periodic signal, a low pass band filter connected to said amplifier for attenuating said fundamental frequency and all harmonic frequencies thereof by an amount substantially proportional to the frequency so as to reduce the amplitudes of the harmonic frequency relative to the amplitude of the fundamental frequency; and an amplitude detector connected between the output of said filter and said attenuator for feeding back a control signal indicative of the signal level at the output of said low pass filter to cause said attenuator to adjust its attenuation to maintain a preset system gain.

7. In a system for deriving the unknown fundamental frequency of a periodic signal, the combination including a plurality of cascade connected stages, each said stage comprising variable signal attenuation means to which said periodic signal is applied, for controlling the amplitude level of said periodic signal in accordance with a control signal, low pass filter means connected to said attenuation means for attenuating all of the harmonic frequencies of said fundamental frequency by an amount substantially proportional to the frequency so as to reduce the amplitudes of the harmonic frequencies relative to the amplitude of the fundamental frequency, and an amplitude detector connected between the output of said filter means and said attenuation means for feeding back a control signal indicative of the signal level at the output of said low pass filter to cause said attenuation means to adjust the amplitude level of said periodic signal to maintain a preset system gain.

8. In a system for deriving the unknown fundamental frequency of a periodic signal, the combination including a plurality of cascade connected stages, each said stage comprising:

an input terminal adapted to receive said periodic signal;

a pair of diodes connected anode-to-anode, the cathode of one of said diodes being connected to said input terminal, said diodes adapted to act as an attenuator in accordance with a control voltage applied to their common anode connection;

transistor amplifier means connected to the cathode of the other of said diodes, said transistor amplifier means including a low pass filter for attenuating said fundamental frequency and all harmonic frequencies thereof so as to reduce the amplitudes of the harmonic frequencies relative to the amplitude of the fundamental frequency;

a feedback circuit connected between the output from said transistor amplifier means and the common anode connection between said pair of diodes, said feedback circuit including means for rectifying the signal output from said transistor amplifier means; and means for smoothing said rectified signal output and applying said rectified and smoothed signal output as a control voltage to the common anode connection between said two diodes.

9. In a system for deriving the unknown fundamental frequency of a periodic signal, the combination including a plurality of cascade connected stages, each said stage comprising:

an input terminal adapted to receive said periodic signal;

a pair of diodes connected anode-to-anode, the cathode of one of said diodes being connected to said input terminal, said diodes adapted to act as an attenuator in accordance with a control voltage applied to their common anode connection;

a capacitor connected between the cathode of the other of said pair of diodes and a common potential, said diodes and capacitor acting in combination to constitute low pass filter means for attenuating all the harmonic frequencies of said fundamental frequency so as to reduce the amplitudes of the harmonic frequencies relative to the amplitude of the fundamental frequency;

amplifier means connected to the cathode of the other of said pair of diodes; and amplitude detector feedback means connected between the output of said amplifier means and said common connection between the anodes of said pair of diodes, said amplitude detector adapted to provide a control voltage which is indicative of the output level of said amplifier, said control voltage acting to vary the attenuation between said pair of diodes.

References Cited by the Examiner
UNITED STATES PATENTS

| | | |
|---|---|---|
| 2,971,159 | 2/1961 | Wilcox et al. |
| 3,098,199 | 7/1963 | Carney et al. _____ 330—110 X |

References Cited by the Applicant
UNITED STATES PATENTS

| | | |
|---|---|---|
| 1,516,518 | 11/1924 | Carson. |
| 1,638,437 | 8/1927 | Gannett et al. |
| 3,002,154 | 9/1961 | Schmitz et al. |

ARTHUR GAUSS, *Primary Examiner.*

J. ZAZWORSKY, *Assistant Examiner.*